(12) United States Patent
Salgado

(10) Patent No.: US 6,723,029 B2
(45) Date of Patent: Apr. 20, 2004

(54) PEDAL MECHANISM FOR CYCLES

(76) Inventor: Refugio Salgado, 1619 E. Grauwyler Apt. 212A, Irving, TX (US) 75061

( * ) Notice: Subject to any disclaimer, the term of this patent is extended or adjusted under 35 U.S.C. 154(b) by 122 days.

(21) Appl. No.: 09/951,288

(22) Filed: Sep. 12, 2001

(65) Prior Publication Data

US 2002/0006852 A1 Jan. 17, 2002

Related U.S. Application Data

(63) Continuation of application No. 09/605,563, filed on Jun. 27, 2000, now abandoned.

(51) Int. Cl.[7] .............................................. A63B 69/16
(52) U.S. Cl. ......................... 482/57; 280/252; 280/258
(58) Field of Search ........................... 482/57; 280/252, 280/253, 256, 257, 258

(56) References Cited

U.S. PATENT DOCUMENTS

| | | | | |
|---|---|---|---|---|
| 3,939,719 A | * | 2/1976 | Stovall | 74/128 |
| 5,915,710 A | * | 6/1999 | Miller | 280/252 |
| 6,024,662 A | * | 2/2000 | Fujimoto | 474/144 |
| 6,129,646 A | * | 10/2000 | Farmos | 474/152 |
| 6,237,928 B1 | * | 5/2001 | Islas | 280/252 |

* cited by examiner

*Primary Examiner*—Nicholas D. Lucchesi
*Assistant Examiner*—Tam Nguyen
(74) *Attorney, Agent, or Firm*—Knechtel, Demeur & Samlan

(57) ABSTRACT

A drive mechanism for bicycles or similar exercise equipment in which the left and right pedals move generally up and down in a vertical plane. The pedals slide on vertical slide bars from their top to bottom positions. The pedals are connected by a pedal chain that engages and rotates a sprocket. The sprocket is in turn connected through a drive shaft to a pair of drive gears. The drive gears are mounted to the drive shaft by means of one way clutches. A reversing bevel gear is mounted between both drive gears to produce a driving output force that is transmitted to the rear drive wheel regardless of whether the left or right pedal is pushed from its top to bottom position. In an alternate embodiment the drive mechanism is adapted for use on a recumbent bicycle and the pedals move in a horizontal plane.

4 Claims, 4 Drawing Sheets

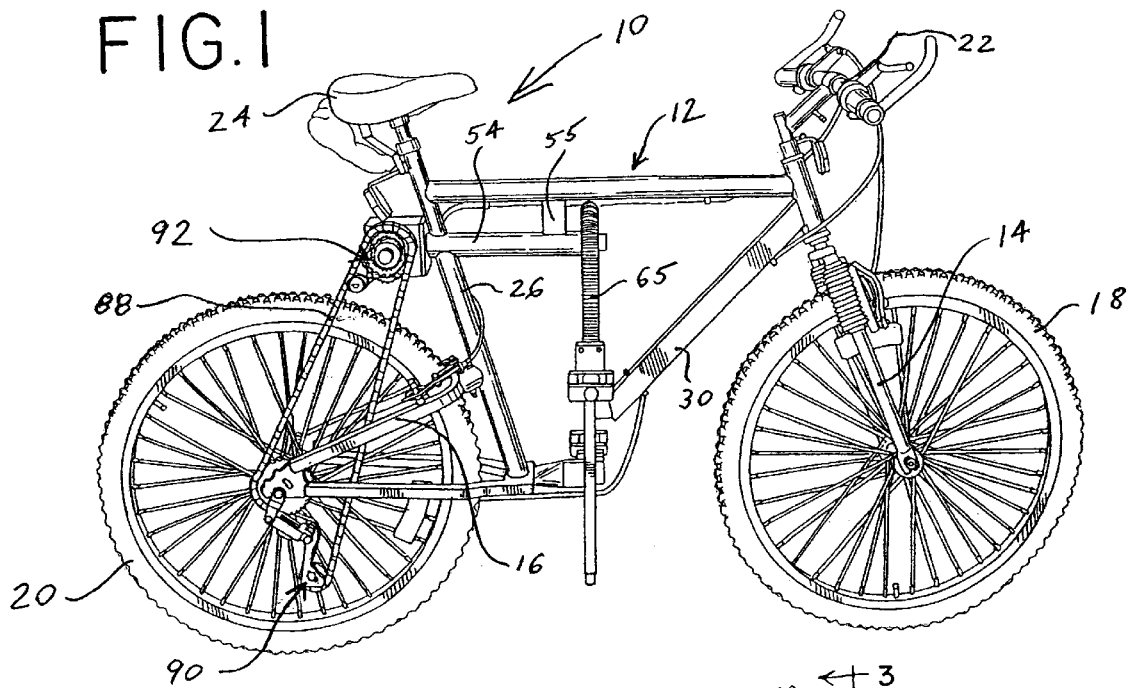
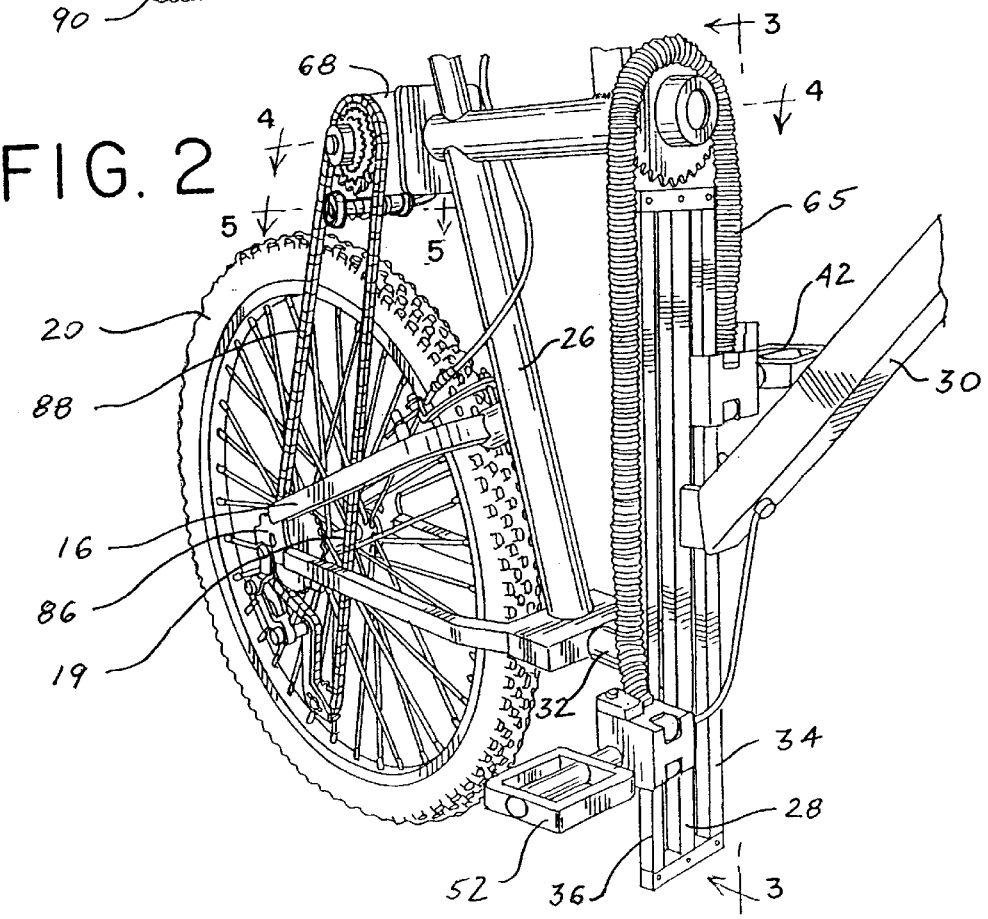

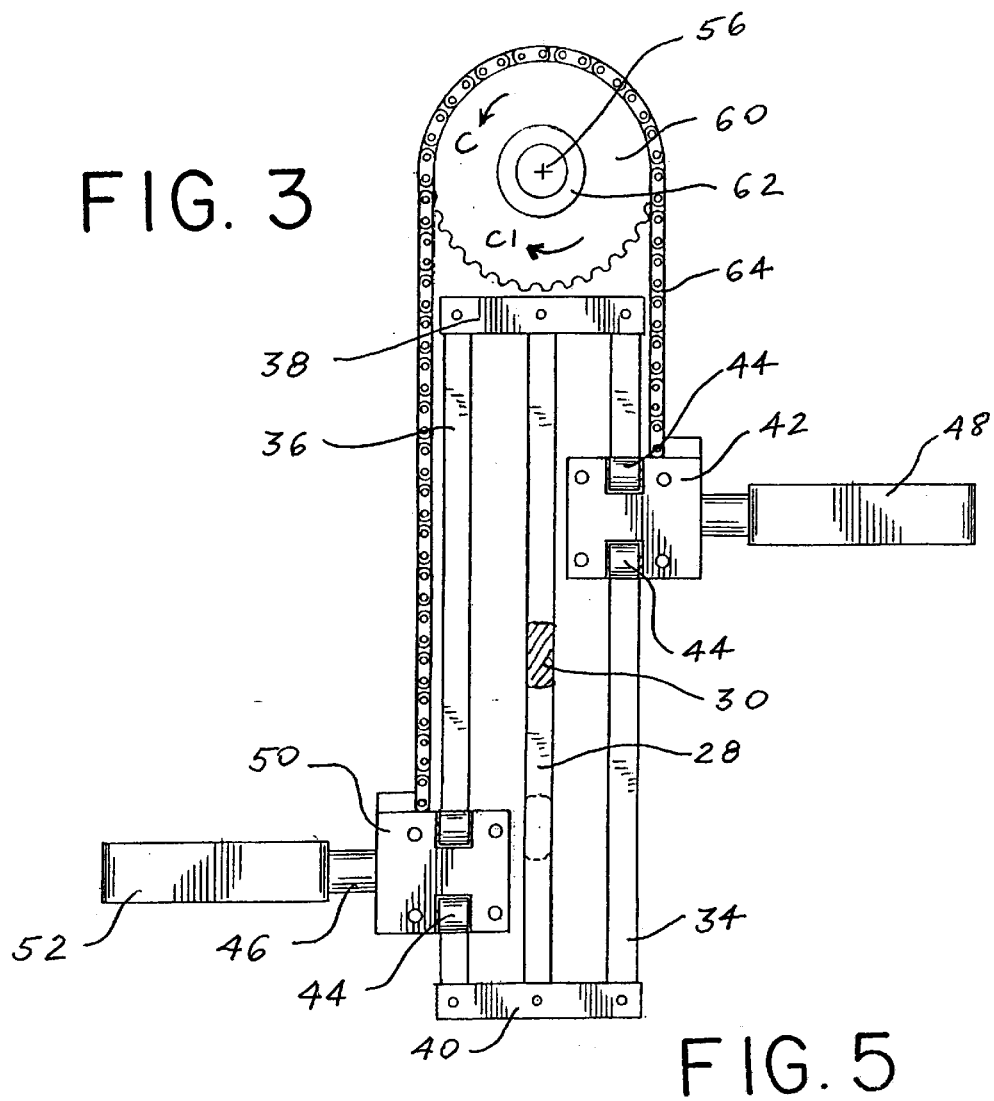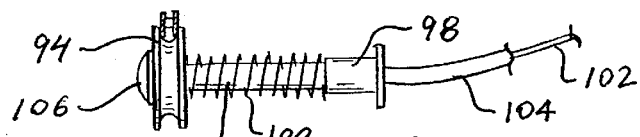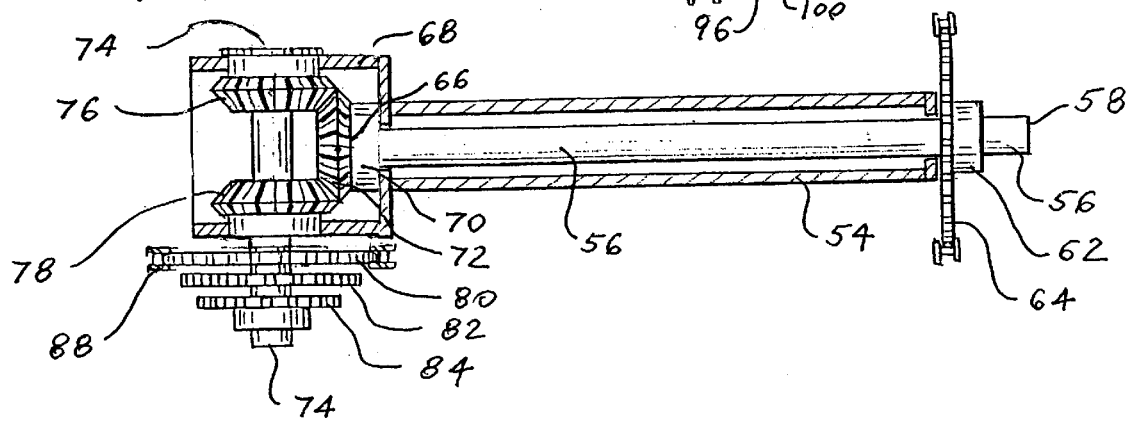

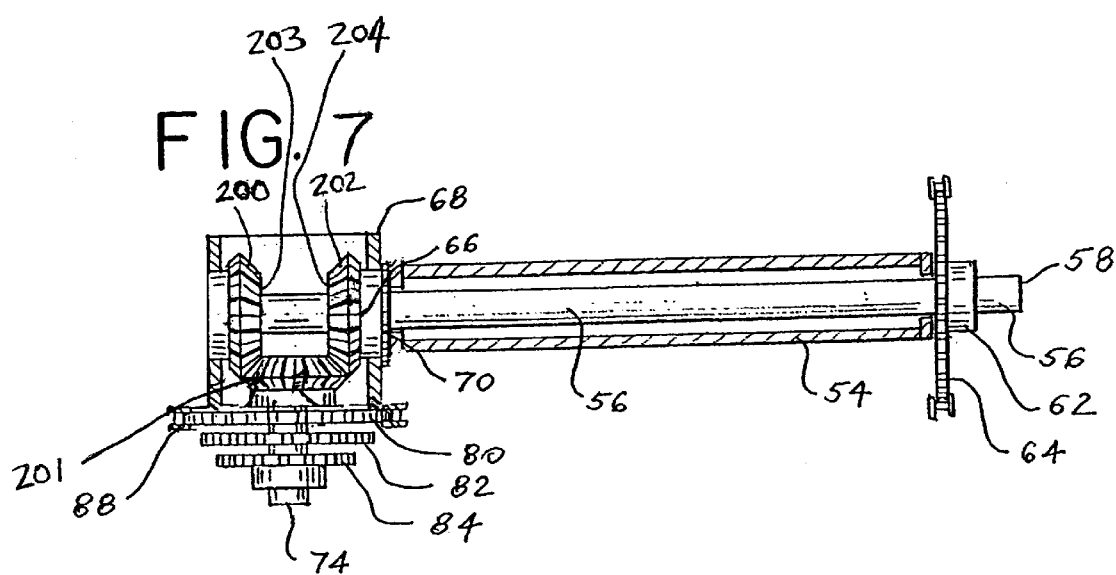

PEDAL MECHANISM FOR CYCLES

RELATED APPLICATION

This application is a continuation in part of application Ser. No. 09/605,563 filed Jun. 27, 2000, now abandoned.

FIELD OF THE INVENTION

This invention relates to a drive mechanism for a bicycle or other pedal driven cycle or exercise equipment. More particularly it relates to a vertical pedal drive for use with such equipment. It also is directed to a pedal drive mechanism in which the pedals move in the same plane, regardless if the plane is vertical or otherwise oriented.

BACKGROUND AND SUMMARY OF THE INVENTION

Conventional bicycles are propelled by a pedal mechanism. The pedals are rotated by the operator applying a rotary force to the pedals in the same direction as the rear drive wheel. The pedals are opposed from each other. The pedals are fastened to a sprocket, which has a drive chain wrapped around it. The drive chain is also wrapped around at least one gear that drives the rear drive wheel of the bicycle.

This mechanism has been used for many years. The force applied to the pedals is a rotary force with the movement of the operator necessarily being a rotary movement. There is a dead spot where little or no power is applied to the sprocket. This occurs where the pedals are in the top and bottom positions. In this position the pedals must have a horizontal force applied to them to further rotate the pedals. A solution to eliminate the dead spot has been illustrated in U.S. Pat. No. 4,564,206 to Lenhardt. Lenhardt illustrates a modified pedal movement in which the circular pedal movement is modified by a closed loop path in which the pedals do not follow a circular path. The modified path eliminates the dead spot. However the short stroke provides a small force to the rear wheel during each stroke.

Another design that uses an up and down movement rather than a rotary movement is shown in U.S. Pat. No. 5,242,182 to Bezerra et al. Through a lever arrangement, power is applied to a gear mechanism, which in turn drives a chain and supplies power to the rear wheel. A problem with this system is that power from the operator is transmitted through a very short stroke resulting in a very small force applied to drive the bicycle during each stroke.

A pedal mechanism that allows the user of a bicycle or exercise equipment to use a stair climbing motion is illustrated in U.S. Pat. No. 5,662,346 to Toronto et al. This illustrates an attachment to a traditional bicycle drive in which the pedals provide a driving force to the rear wheel while the pedals are rotated in opposite directions. A reversing gear is added to the drive sprocket mechanism to provide a driving force to the chain drive. A shortcoming of this device, as in the other prior art devices, is that the drive mechanism still uses a substantially rotary movement of the pedals rather than a purely vertical movement.

In U.S. Pat. No. 3,939,719 issued to Stovall illustrates a bicycle that converts reciprocating motion to unidirectional rotation of an output shaft. The drive mechanism is attached near the bottom of the bicycle frame. The shaft driven by the reciprocating motion has one drive gear mounted on it, which in turn drives two clutches mounted driven gears.

It is an object of the present invention to provide a new and unique drive mechanism for a bicycle or other similar exercise device in which the drive mechanism uses a vertical up and down movement of the user's legs. It is a related object to provide a pedal mechanism in which the pedals move in the same plane, which plane may be vertical, horizontal or in between the two. It is a related object to provide a drive mechanism that eliminates the rotary movement of the pedal drive mechanism of the past devices.

Yet another object is to provide a unique drive mechanism that provides power to the bicycle's rear drive wheel during the downward stroke of either leg of the user. A related object is to provide power during the entire forward stroke while eliminating the loss of power due to horizontal movement of the pedals.

Still another object is the object of providing a new drive mechanism that uses the vertical stroke of the user's legs, converts the vertical movement to a rotary drive, and provides the rotary power to the rear drive wheel of the bicycle. Related to this object is the object of providing power to the drive wheel by means of a unique reversing gear system that drives the rear drive wheel regardless of the pedal that is depressed.

Still another object is to provide a drive mechanism that uses a pair of gears mounted on one way clutches to provide power to the rear driving wheel.

An advantage of the unique drive system is that it transmits power to the rear drive wheel during the entire forward or downward stroke of either the left or right pedal. No power is lost as the pedals move only in the reciprocating direction.

These and other objects and advantages will be apparent from reading the Description of the Drawings and Description of the Preferred Embodiment.

DESCRIPTION OF THE DRAWINGS

FIG. 1 is a perspective view of a bicycle having the unique inventive vertical pedal drive mechanism.

FIG. 2 is an enlarged front perspective view with portions removed of the vertical pedal drive mechanism showing the vertical pedal drive mechanism connected to the rear wheel drive mechanism.

FIG. 3 is a front view taken along line 3—3 of FIG. 2 showing the vertical pedal drive.

FIG. 4 is a cross sectional view taken along line 4—4 of FIG. 2 with portions removed showing the drive shaft connected by means of bevel gears to the rear wheel gear shaft.

FIG. 5 is a top view taken along line 5—5 of FIG. 2 showing the top gear derailleur mechanism.

FIG. 7 is a cross sectional view similar to FIG. 4, with portions removed, of an alternate embodiment in which the drive shaft has two clutch mounted drive gears that engage a driven gear system.

DESCRIPTION OF THE PREFERRED EMBODIMENT

Figure 6:
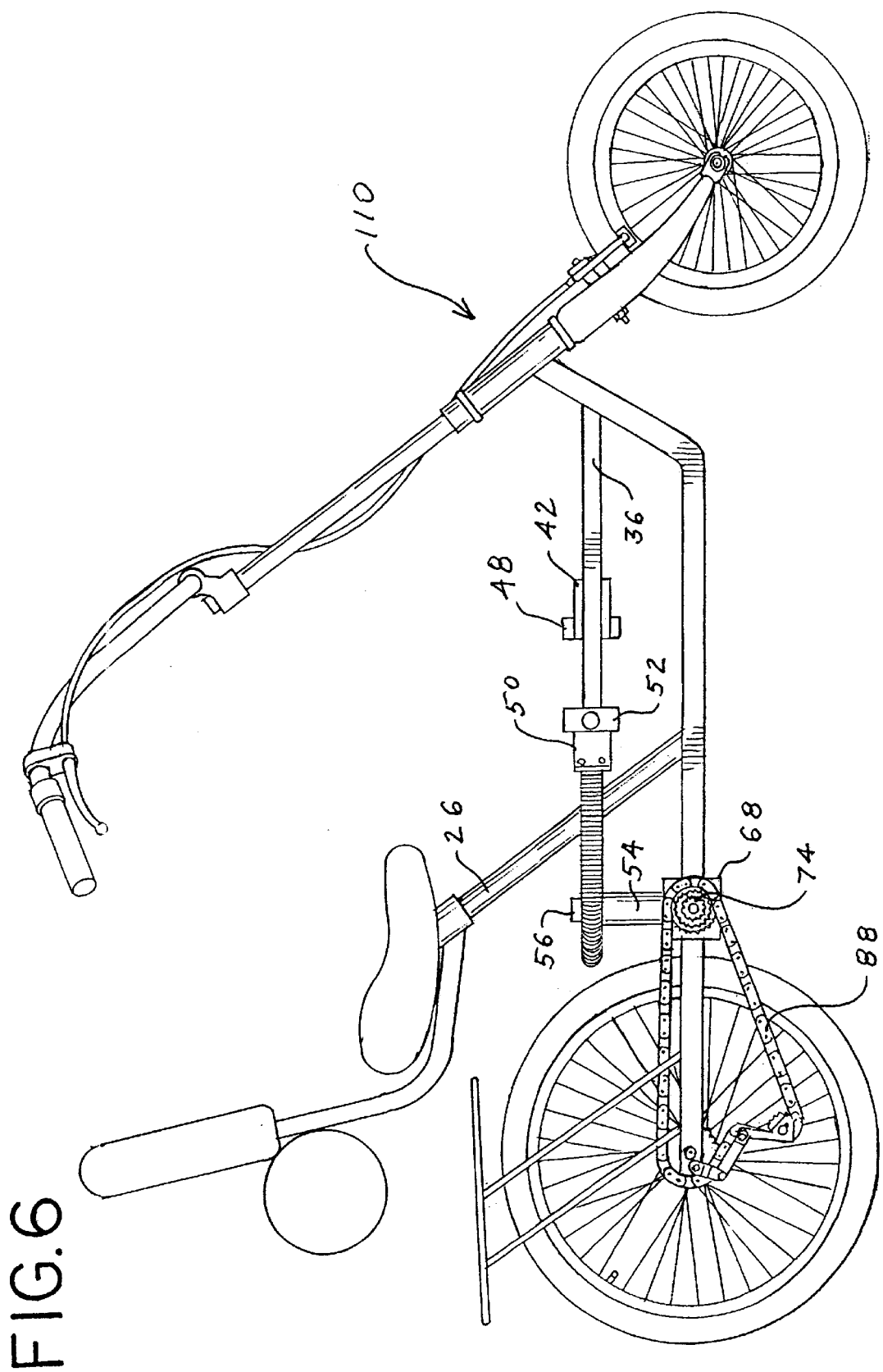
FIG. 6 is a side view of an alternate embodiment in which a recumbent bicycle has been retrofitted for the inventive pedal drive mechanism in which the pedals move in a substantially horizontal direction, but both move in the same horizontal plane.

Turning first to FIG. 1, there is illustrated a bicycle 10 that is driven by the drive mechanism of the present invention. The bicycle 10 is shown as a conventional two wheel bicycle but can be a tricycle or stationary exercise device. Also the bicycle can be a recumbent bicycle as illustrated in FIG. 6. All of these devices are capable of using the pedal drive mechanism. There is a bicycle frame 12 that has a front fork 14 and rear fork 16. A front wheel 18 is attached to the front fork 14 and a rear drive wheel 20 is attached to the rear fork 16. The rear wheel is mounted on a rear wheel shaft 19 that is attached to the rear fork in a conventional manner. Handlebars 22 steer the front wheel 18 and an operator sits on a seat 24 that is supported by a seat tube 26. The above mentioned components are of a conventional design.

FIG. 2 illustrates the modifications to the frame to accommodate the unique vertical pedal drive mechanism. A vertical center support member 28 is attached to the frame 12 by means of a diagonal frame member 30. The vertical support also has its lower end attached tot he frame seat tube 26 by means of a tubular connector support 32. These two rigid mounting means maintain the center support in a vertical orientation between the front wheel 18 and rear drive wheel 20.

FIGS. 2 and 3 illustrate the components of the pedal mechanism. There is a left vertical slide rod 34 and a right vertical slide rod 36 mounted parallel to and on either side of the center support 28. The left vertical slide rod 34, right vertical slide rod 36 and center support 28 are rigidly connected at their respective top and bottom ends to a cross member 38 and bottom cross member 40. This results in a rigid rectangular slide bar assembly attached to the bicycle frame 12 so that the slide bars are retained in a vertical orientation.

There is a left pedal block assembly 42 mounted to the left vertical slide rod 34. The slide rod 34 is received in a vertical passageway in the left pedal block assembly 42. Rollers 44 are placed at the top and bottom of the block assembly 42 to allow the block assembly 42 to easily and freely slide up and down along the slide rod 34. A pivotal pedal mounting shaft 46 is mounted to the outside of left pedal mounting block 42. A left pedal 48 is in turn mounted to the pivotal pedal mounting shaft. The right vertical slide rod 36 has a right pedal mounting block assembly 50 mounted to it. The mounting arrangement is identical to the left pedal block assembly. There is a right pedal 52 mounted to the pedal mounting shaft 46 that is in turn mounted to the outside of the right pedal mounting block assembly 50.

Located near the top center of the frame is a hollow crossbar 54. This is attached to the frame 12 near its forward end by means of a support member 55. The other end or rearward end of the crossbar 54 is attached to the seat tube 26. There is a drive shaft 56 disposed within the crossbar 54. A forward end 58 of the drive shaft 56 extends out from the crossbar 54 toward the front of the bicycle. Mounted to the drive shaft 56 just in front of the forward end of the crossbar 54 is a sprocket 60. A locking collar or nut 62 keeps the sprocket 60 in place.

There is a pedal drive chain 64 that one end connected to the left pedal block 42 and has its other end connected to the right pedal block 50. The pedal drive chain passes over and engages the teeth on the sprocket 60. The length of the drive chain 64 is chosen so that when the left pedal mounting block 42 and its respectively mounted left pedal 48 are at the top of their travel and in their top position, the right pedal mounting block 50 and its respectively mounted right pedal 52 are at the bottom of their travel and in their bottom position. The pedals will be opposite each other when they are mid way between their top and bottom positions. As seen in FIGS. 1 and 2 there is a flexible chain cover 65 that extends around and over the drive chain 64. This keeps dirt and grease from contacting the operator when riding the bicycle.

As seen in FIG. 4 an opposite end 66 of the drive shaft 56 opposite the end 58 terminates in a gear housing 68. The gear housing 68 is mounted to the frame 12 below the seat 24 and in alignment with the crossbar 54. A spacer bushing 70 maintains and positions the axial position of the driveshaft 56 in the gear housing 68. A reversing bevel gear 72 is mounted to the end 66 of the drive shaft 56 so that it rotates with the shaft 56. A top gear shaft 74 is rotatably received in the gear housing 68. Its long axis is perpendicular to the long axis of the drive shaft 56.

Mounted on the top gear shaft 74 and within the gear housing 68 are a first bevel gear 76 and a second bevel gear 78. The first and second bevel gears 76 and 78 are each mounted to the top gear shaft 74 by means of one way clutch mechanisms. The clutch mechanisms allow the first and second bevel gears to rotate freely in the counterclockwise direction when looking at the right side of the bicycle and engage the shaft 74 when the gears 76 or 78 are rotated in the clockwise direction. The first and second bevel gears 76, 78 are mounted on the gear shaft 74 to simultaneously engage the reversing bevel gear 72.

Mounted to the top gear shaft 74 and outside of the gear housing 68 are a plurality of top gears 80, 82, and 84. These top gears are mounted to the top gear shaft to rotate with it. The diameter and number of the teeth on the top gears vary to provide the operator of the bicycle a series of gear ratios. At least one lower drive gear 86 is mounted to the rear wheel shaft 19. Preferably more than one lower drive gear is mounted to the shaft 19 to provide a plurality of gear ratios. A rear wheel drive chain 88 passes around one of the top gears and the lower drive gear 86 to connect the gears in force transmitting relationship. A conventional bottom gear derailleur 90 moves the chain 88 to engage the different lower drive gears, assuming that there is more than one lower drive gear.

There is a top gear derailleur 92 attached to the underside of the gear housing 68. As seen in FIG. 5, the top gear derailleur 92 is comprised of a pulley wheel 94 that has the rear wheel drive chain 88 passing over it. The wheel 94 is slidably mounted on an inner collar 96. The collar 96 slides inside of an outer collar 98. A spring 100 is wrapped around the inner collar 96 and has one side abutting against the pulley wheel 94. The other side of the spring 100 rests against the outer collar 98. A cable 102 runs through a cable cover 104 and has one end of it connected to an operator controlled gearshift lever (not illustrated) and the other end attached to an end cap 106. The end cap 106 is positioned on the side of the pulley wheel opposite the spring 100. When the operator shifts the gear shift lever, the cable pulls the end cap 106, which in turn pulls the pulley wheel 94 toward the outer collar 98. The inner collar 96 slides into the outer collar 98 and the wheel 94 moves a distance sufficient to move the rear wheel drive chain 88 from one top gear to another. By moving the gear shift lever in the opposite direction, the spring 100 pushes the pulley wheel 94 in the opposite direction and the chain is positioned over a different top gear. In this manner the operator can select the top gear desired for the chosen gear ratio and speed. A similar selection process is implemented for the selection of the lower drive gear.

In order for the operator to use the vertical pedal mechanism, the operator only must position his or her legs on opposite sides of the bicycle frame 12. The left foot is positioned on the left pedal 42 and the right foot is positioned on the right pedal 52. Assuming the pedals are in the position shown in FIG. 3, the left pedal 48 is in a raised position. The operator pushes down on pedal 48. This causes the left pedal mounting block 42 to move down. The pedal drive chain 64 moves down and the sprocket 60 is driven in a clockwise direction. Drive shaft 56 also rotates in a clockwise direction. The reversing bevel gear 72 drives the first bevel gear in a clockwise direction. The one way clutch engages the top gear shaft 74 driving it in a clockwise direction. The top gear also rotates in the clockwise direction, which in turn drives the rear wheel drive chain 88 clockwise. As the chain 88 engages the lower drive gear 86, it is driven in clockwise and drives the rear wheel 20 in a forward moving clockwise direction. The second bevel gear 78 is driven in a counter clockwise direction by the reversing gear 72. However, since it is also mounted on a one way clutch that allows free wheeling in the counter clockwise direction, the second bevel gear merely freely rotates in the counter clockwise direction without transmitting any drive force.

When the left pedal 48 reaches the bottom of its stroke, the right pedal 52 is at its top position. The operator pushes down on the right pedal 52 and the pedal drive chain 64 causes the sprocket 60 and drive shaft 56 to rotate in the counter clockwise direction. The reversing bevel gear 72 drives the second bevel gear 78 in the clockwise direction. The one way clutch engages the top gear shaft 74 causing it to rotate in the clockwise direction. This transmits power to the rear wheel 20 in the same manner as previously described. The first bevel gear 76 is rotated in the counter clockwise direction and its one way clutch allows it to freely spin in this direction.

In this manner, a driving force is applied to the rear wheel when either the left or right pedal is pushed from its top to its bottom position. The operator's full force is applied vertically down on the pedals and transmitted through the drive mechanism to the rear wheel. There is no lost motion such as in rotary pedaling systems.

FIG. 7 illustrates an alternate embodiment of a unique drive mechanism. Instead of the drive shaft 56 having the reversing bevel gear 72 mounted to the end 66, the shaft 56 is extended through the entire gear housing 68. Thus the shaft enters the housing at one end and extends to and is mounted for rotation in the opposite end. Mounted on the drive shaft 56 and inside of the gear housing 68 is a pair of bevel gears 200 and 202. The bevel gears 200 and 202 are mounted to the drive shaft 56 by means of one way clutches 203 and 204 respectively. The clutches 203 and 204 allow the bevel gears 200 and 202 to rotate freely in one direction and engage the shaft 56 when rotated in the opposite direction as will be described below.

When the right pedal 52 is pushed down toward the ground, the sprocket 60 rotates in the direction C which is the counterclockwise direction as seen from the front view in FIG. 3. Gear 202 rotates in the same direction C and its clutch 204 engages the shaft 56. As can be seen in FIG. 7, there is also a driven bevel gear 201 that engages both bevel gears 200 and 202. Bevel gear 201 engages gear 200 and rotates it in an opposite direction C1, but its clutch 203 allows it to freely rotate with respect to the shaft 56. Driven bevel gear 201 is mounted on the top gear shaft 74. As the gear 202 rotates in direction C, driven bevel gear 201 and shaft 74 are driven in direction D, which is clockwise as seen in FIG. 1. Mounted on the shaft 74 is a plurality of top gears that drive the rear wheel drive chain 88 as previously described. This provides a driving force to the rear drive wheel 20.

When pedal 48 is pushed downward toward the ground, the sprocket 60 rotates in the direction C1. Drive shaft 56 rotates in the direction C1 and gear 200 also rotates in the direction C1 because the clutch 203 engages the shaft 56. The gear 200 drives the driven bevel gear 201 in the direction D, the same direction that gear 201 was driven by the gear 202. The clutch 204 allows the gear 202 to rotate freely in the direction C with respect to the shaft 56. Thus the shaft 74 and the top gears mounted to it are always rotating in the same direction to apply the driving force to the rear wheel 20. Both of the bevel gears 200 and 202 are mounted to the same drive shaft 56 and engage one driven bevel gear 201.

If the driven bevel gear 201, shaft 74 and its associated top gears 80, 82 and 84 are mounted on the reverse side of the bicycle frame 30, the rest of the drive mechanism including the operation of the one way clutches and the chain drive associated with driving the rear wheel 20 will all be reversed. The operation will be a mirror image of the above described operation and will mechanically function in the same manner.

Throughout the description of FIGS. 1–5 and 7, the pedal mechanism is described as moving in a vertical, up and down path. However, it can be easily recognized that the pedal drive mechanism can be used on a recumbent bicycle such as illustrated in FIG. 6. The previous description of vertical movement of the pedals can be equally applicable to horizontal movement or any movement between the vertical and horizontal movement. The previous description of the term "down" or "downward" can be changed to or can also encompass the term "forward". Similarly the term "up" can also encompass the term "backward" or "return". Thus the user's leg movement and the pedals can be interpreted as a forward and return movement.

FIG. 6 illustrates the unique pedal drive mechanism when adapted for use on a recumbent bicycle. The movement of the pedals is always in one plane regardless of whether the movement is up and down, horizontal, or in between the two. The pedals move forward to their bottom positions and return to their starting or top position. Thus the plane of the pedals can be vertical, horizontal, or at an angle between the two.

As seen in FIG. 6, there is a recumbent bicycle 110. The standard pedal mechanism has been replaced with Applicant's inventive design. Wherever possible the same numbers have been used as in the previous embodiment to identify like parts. The right pedal 52 is attached to the right pedal mounting block assembly 50. On the other side is the left pedal 48 mounted to the left pedal mounting block assembly 42. The right slide rod 36 and left slide rod are now mounted substantially horizontally instead of vertically. However, the left and right slide rods and their respective pedals are still mounted for movement in the same plane, regardless if the plane is vertical, horizontal, or in between the two.

Movement of the pedals from their top to their bottom positions moves the drive chain 64 around the sprocket 60. The drive shaft 56 is now mounted vertically instead of horizontally. It is rotated first in one direction and then the other. Through the reversing bevel gear arrangement mounted in the gear housing 68 as previously described, the drive shaft will rotate in only the driving direction. The output gear shaft 74, which has a plurality of gears mounted on one end, provides power to the rear wheel by means of the rear wheel drive chain 88. The derailleur mechanism is similar to the derailleur mechanism previously described except modified to accommodate the new mounting and orientation of the gears. Thus the pedal drive mechanism can be adapted for various mountings depending on the orientation desired.

While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A drive mechanism for a cycle or similar exercise equipment having a cycle frame and a driving rear wheel comprising:

a right pedal assembly and a left pedal assembly, each structured for reciprocating movement between a top and a bottom position;

a single sprocket wheel mounted to the cycle frame, the single sprocket wheel positioned at the top of the cycle frame above the driving rear wheel, the sprocket wheel having a horizontal axis;

a drive shaft mounted to the cycle frame, the drive shaft mounted at the top of the cycle frame and in the same horizontal axis as the single sprocket wheel;

means for mounting the sprocket wheel on the drive shaft;

an elongated pedal chain terminating in a first end and a second end, the first end attached to the right pedal assembly and the second end attached to the left pedal assembly, the pedal chain passing around a portion of the sprocket wheel and engaging the sprocket wheel in a driving relationship, the pedal chain pulling the right pedal to the top position when the left pedal is pushed to the bottom position and pulling the left pedal to the top position when the right pedal is pushed to the bottom position, the pedal chain providing a rotational force to the sprocket wheel;

a gear mechanism substantially vertically oriented above the rear wheel and operatively connected to the drive shaft for imparting a driving force to the rear wheel when either the right pedal or the left pedal is pushed to its bottom position, the gear mechanism comprising a top gear shaft, a first drive gear mounted to the drive shaft by means of a first clutch for engaging the drive shaft in a driving relationship when the drive shaft is rotated in a first direction and for permitting the first drive gear to rotate freely about the drive shaft when the drive shaft is rotated in a second direction opposite the first direction, a second drive gear mounted to the drive shaft by means of a second clutch for engaging the drive shaft in a driving relationship when the drive shaft is rotated in the second direction and for permitting the second drive gear to rotate freely about the drive shaft when the drive shaft is rotated in the first direction, a reversing gear simultaneously engaging both the first and second drive gears to rotate the first and second drive gears simultaneously in opposite directions when either pedal is pushed downward to its bottom position, the reversing gear mounted on the top gear shaft for providing power to the rear wheel when either pedal is pushed to its bottom position;

the movement of the right pedal or left pedal from their respective top to bottom positions causing the pedal chain to rotate the sprocket wheel and drive shaft in the first direction when the right pedal is pushed forward from its top position to its bottom position, and in the second direction opposite the first direction when the left pedal is pushed from its top position to its bottom position;

at least two rear drive gears mounted on the top gear shaft and above the rear wheel;

at least two rear wheel sprocket gears mounted to the rear wheel below the at least two rear drive gears;

a rear wheel drive chain substantially vertically oriented and connecting in a driving manner the at least two rear drive gears to the at least two rear wheel sprocket gears; and gear derailleur means for moving the rear wheel drive chain to either of the rear drive gears or either of the two rear wheel sprocket gears.

2. The drive mechanism of claim 1 and further comprising a right slide bar and a left slide bar, the right pedal assembly slidably received on the right slide bar and the left pedal assembly slidably received on the left slide bar.

3. The drive mechanism of claim 1 wherein the first drive gear and the second drive gear comprise first and second bevel gears mounted to the gear shaft by means of one way driving clutches, and the reversing gear is a bevel gear engaging the first and second bevel gears at 90°.

4. The drive mechanism of claim 2 wherein the right and left slide bars are vertically mounted to the cycle frame.

* * * * *